United States Patent
Takagi et al.

[15] 3,666,816
[45] May 30, 1972

[54] METHOD FOR PRODUCTION OF METHYL ISOBUTYL KETONE

[72] Inventors: Kazumi Takagi; Masahiro Murakami; Koichi Iketani, all of Niihama-shi, Japan

[73] Assignee: Sumitomo Chemical Company, Ltd., Osaka, Japan

[22] Filed: Oct. 6, 1969

[21] Appl. No.: 864,173

[30] Foreign Application Priority Data

Oct. 12, 1968 Japan....................................43/74498
Feb. 3, 1969 Japan....................................44/8380
Aug. 1, 1969 Japan....................................44/61162

[52] U.S. Cl.............................................260/593, 252/466
[51] Int. Cl.............................................................C07c 49/04
[58] Field of Search...............................................260/593 R

[56] References Cited

FOREIGN PATENTS OR APPLICATIONS

| 1,015,003 | 12/1965 | Great Britain | 260/593 R |
| 4,024,977 | 1/1965 | Japan | 260/593 R |
| 592,101 | 2/1960 | Canada | 260/593 R |

*Primary Examiner*—Daniel D. Horwitz
*Attorney*—Stevens, Davis, Miller & Mosher

[57] ABSTRACT

A novel method for producing methyl isobutyl ketone from acetone and hydrogen in one stage with improved conversion and selectivity by contacting acetone in liquid phase with hydrogen in the presence of a catalyst of (a) palladium and synthetic zeolite, or (b) palladium and alumina together with or without thorium oxide, zirconium oxide and/or chromium oxide, at a temperature of 100° to 250° C. and under a partial pressure of hydrogen of 0.1 to 10 kg per square centimeter.

2 Claims, No Drawings

METHOD FOR PRODUCTION OF METHYL ISOBUTYL KETONE

The present invention relates to a method for producing methyl isobutyl ketone in one-stage from acetone and hydrogen in liquid phase.

Methyl isobutyl ketone (referred to MIBK hereinafter), which is useful as an organic solvent and an ingredient of paints and the like, has been conventionally synthesized from acetone and hydrogen according to the following reaction scheme:

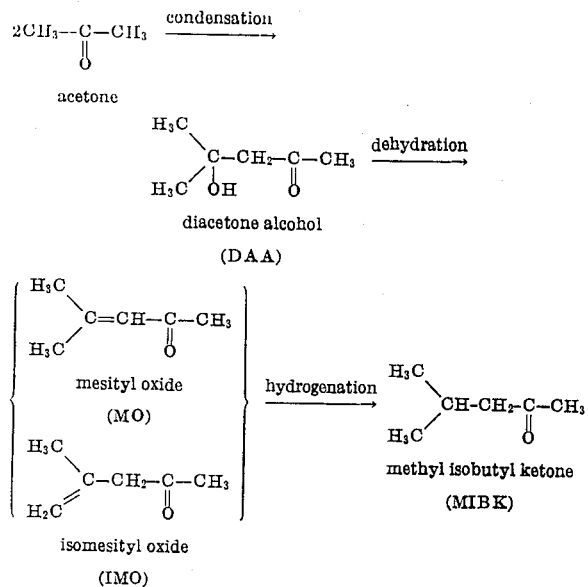

In the most common practice, the steps of condensation, dehydration and hydrogenation have been, hitherto, conducted successively in the order given above. Thus, the conventional process comprises contacting in liquid phase under atmospheric pressure acetone with a solid alkaline catalyst such as barium hydroxide and the like at a temperature of 10° to 20° C. to produce diacetone alcohol with a conversion of about 15 percent owing to an equilibrium of the reaction, separating the resulting diacetone alcohol from unreacted acetone, subjecting the alcohol to dehydration by heating at a temperature of 100° to 120° C. in liquid phase in the presence of an acid catalyst such as sulfuric acid, phosphoric acid and the like to form mesityl oxide and isomesityl oxide, separating and purifying the resulting mixture of oxides, and then subjecting the mixture of oxides to hydrogenation in vapor phase at a temperature of 140° to 150° C. under atmospheric pressure over a catalyst of copper-type or of palladium-type supported on alumina, silica or carbon and the like to form MIBK. The over-all selectivity for MIBK is about 80 to 85 percent.

Another process is known to produce MIBK directly from acetone by subjecting the latter in liquid phase to the reaction with hydrogen under a pressure of 20 atmospheres at a temperature of 100° to 150° C. in the presence of an ion-exchange resin of acid-type, which catalyzes condensation and dehydration, and of palladium-carbon, which catalyzes hydrogenation (German Pat. No. 1238453).

However, in the conventional process, three steps of operation, i.e., condensation, dehydration and hydrogenation, are necessary, and, moreover, the separation and purification of the intermediate products such as diacetone alcohol and mesityl oxides are necessary between steps, resulting in complication of the operation and lowering of the over-ll yield.

In the process for manufacturing MIBK directly from acetone by the aid of acid-type ion-exchange resin and palladium-carbon as catalysts, there still exist two significant disadvantages, despite the improvements attained in the simplified operation and comparatively high selectivity. A disadvantage is a low conversion of acetone, which means a low yield of MIBK per unit volume of catalyst, owing to the low rate of reaction resulted from the low reaction temperature, since the upper limit set by the nature of the ion-exchange resin is at about 150° C. Other disadvantage is the use of a mixture of two catalysts of the entirely different properties, i.e., acid-type ion-exchange resin and palladium-carbon; said mixture is difficult to be distributed homogeneously in the reactant charge, and is inconvenient to handle; and the large volume occupied by the mixture tends to make the reactor uneconomical.

An object of the present invention is to provide a method for producing MIBK, without foregoing disadvantages of the prior art, by simple operation and with excellent conversion and selectivity.

The present invention provides a method for producing MIBK directly from acetone in one-stage operation, which comprises contacting acetone with hydrogen in liquid phase in the presence of a catalyst of (a) palladium and synthetic zeolite (Catalyst A), or (b) palladium and alumina together with or without thorium oxide, zirconium oxide and/or chromium oxide (Catalyst B), at a reaction temperature of 100° to 250° C. under a partial pressure of hydrogen in the reaction system within the range of 0.1 to 10 kg. per square centimeter.

The present invention will be more particularly explained by the following description.

Catalyst A may be prepared by impregnating synthetic zeolite with an aqueous solution of palladium salt, and reducing the salt supported on the synthetic zeolite to palladium metal. Examples of the palladium salt include palladium chloride and nitrate. The reducing may be effected, for example, with an aqueous solution of hydrazine or with hydrogen in gaseous phase. Alternatively, active carbon, alumina, silica or the like is impregnated with an aqueous solution of palladium salt, and after being reduced to the palladium metal in the same way as mentioned above, it may be admixed with synthetic zeolite. The amount of palladium metal supported on the synthetic zeolite is 0.2 to 3.0 percent by weight. When used in admixture with synthetic zeolite, the ratio of synthetic zeolite to the palladium-loaded carrier may be varied optionally within the range of 1 : 0.1 to 1 : 10 by weight.

Catalyst B may be preferably prepared by impregnating alumina with an aqueous solution of palladium salt and reducing the salt supported on the alumina to palladium metal as usual with an aqueous solution of hydrazine or with hydrogen in gaseous phase. Catalyst B containing thorium oxide, zirconium oxide and/or chromium oxide is preferably prepared by impregnating alumina with an aqueous solution of the mixture of thorium, zirconium and/or chromium salt (such as nitrate and chloride) and palladium salt, drying and heating the impregnated alumina in the air to convert the salt supported on alumina into oxide, and subsequently reducing palladium salt to palladium metal as usual with an aqueous solution of hydrazine or with hydrogen in gaseous phase. Any activated alumina may be used as the component material, but gamma-alumina is preferable. In the present process alumina component would have a catalytic action mainly for the condensation and dehydration reactions. The amount of palladium supported on alumina is preferably 0.1 to 5.0 percent by weight, and in case that thorium oxide, zirconium oxide and/or chromium oxide is also supported on alumina, the amount of the oxide in the catalyst is preferably 2 to 30 percent by weight. Palladium metal and said oxide would have a catalytic action mainly for the hydrogenation reaction.

The reaction of the present invention is carried out in liquid phase under hydrogen pressure. Reaction temperatures from 100° to 250° C., preferably from 130° to 210° C. should be used, since at lower temperatures the amount of diacetone alcohol, which is an intermediate product of the reaction, tends to increase in the final product, whereas at higher temperatures the amount of by-products such as diisobutyl ketone, mesitylene and the like tends to increase. Preferable reaction time is 0.5 to 5 hours.

During the course of reaction, while acetone presents its own vapor pressure corresponding to the reaction temperature, hydrogen should be introduced into the reacting system so as to maintain its partial pressure at 0.1 to 10 kg. per square centimeter, preferably at 0.5 to 5 kg. per square centimeter. The amount of catalyst to be used is preferably 10 to 100 wt. percent based on acetone used.

The reaction may be carried out either continuously or batch-wise. In the continuous operation hydrogen is preferably supplied so as to maintain constant partial pressure while feeding acetone in constant flow. In the batch-wise operation, as soon as the partial pressure of hydrogen in the reacting system decreases as the reaction proceeds hydrogen should be supplied to maintain its partial pressure at the desired level. After the reaction, the reaction product is distilled to separate MIBK, unreacted acetone and minor quantities of by-products, and the unreacted acetone is recycled to the reaction.

Example of the selectivity at the acetone conversion of 30 to 60 percent is 93 to 98 percent for MIBK, 0 to 1.5 percent for mesitylene, 0 to 0.3 percent for mesityl oxide (including isomesityl oxide), 0.1 to 1.5 percent for isopropyl alcohol, 0.5 to 4.2 percent for diisobutyl ketone, 0 to 2.5 percent for 4,6-dimethylheptanone-2 and 0.1 to 0.8 percent for diacetone alcohol.

The reaction product is colorless and clear. No harmful tarry by-product is formed at all. Taking into account the equilibrium of the condensation reaction of acetone, the conversion is surprisingly high. Thus, the process according to the present invention enables the conversion of acetone into MIBK directly in one-stage operation with both high conversion and high selectivity.

The present invention is illustrated in more detail by the following examples which are not to be construed to restrict the scope of the invention.

EXAMPLE 1

The catalyst used was prepared by impregnating "Molecular Sieve 13X" (in the form of pellet having a size of one-sixteenth inch, a product marketed by Linde Company) with an aqueous solution (containing 2 percent of HCl) of palladium chloride at 25° C. for 60 minutes, and, after being dried, reducing with hydrogen at 200° C. The amount of palladium metal supported on the pellet was 0.4 percent by weight. 30 ml. of acetone and 10 ml. of the above catalysts were introduced into an autoclave having the capacity of 100 ml. and provided with a stirrer, and the autoclave was heated to a temperature of 180° C. in an oil bath. Hydrogen was then introduced to a total inside pressure of 17 kg./cm$^2$, the partial pressure of hydrogen inside the autoclave being 2 kg./cm$^2$ (the vapor pressure of acetone is 15 kg./cm$^2$ at 180° C.). As the reaction proceeded fresh hydrogen was introduced intermittently to compensate the pressure drop and restore the total pressure to its initial level of 17 kg./cm$^2$. After 4 hours of reaction the autoclave was cooled and the reaction product, discharged from the autoclave, was analyzed by means of gas chromatography after removal of hydrogen. The conversion of acetone was 43.8 percent, and the selectivities were 95.8 percent for MIBK, 0.8 percent for mesitylene, 2.0 percent for isopropyl alcohol, 1.2 percent for diisobutyl ketone, and 0.2 percent for diacetone alcohol. The reaction product was clear and colorless.

EXAMPLE 2

A palladium-carbon catalyst was prepared by impregnating active carbon with a solution (containing 2 percent of HCl) of palladium chloride at 25° C. for 60 minutes, and reducing, after being dried, with an alkaline aqueous solution of hydrazine at 40° C. 30 ml. of acetone, 10 ml. of "Molecular Sieve 13X" (pellet; size: one-sixteenth inch marketed by Linde Company) and 5 ml. of the palladium-carbon catalyst were introduced into an autoclave of 100 ml. capacity equipped with a stirrer. The autoclave was immersed in an oil bath and was heated to a temperature of 200° C. Hydrogen was then introduced into the autoclave to a total inside pressure of 28 kg./cm$^2$, the partial pressure of hydrogen inside the autoclave being 5.5 kg./cm$^2$ (the vapor pressure of acetone is 22.5 kg./cm$^2$ at 200° C.). As the reaction proceeded fresh hydrogen was introduced intermittently into the autoclave to compensate the decreased amount of hydrogen and maintain the inside pressure at 28 kg./cm$^2$. After 4.5 hours of reaction, the autoclave was cooled and the reaction product discharged from the autoclave was analyzed by means of gas chromatography after removal of hydrogen. The conversion of acetone was 52.4 percent and the selectivities were 96.3 percent for MIBK, 0.9 percent for mesitylene, 0.9 percent for isopropyl alcohol, 1.5 percent for diisobutyl ketone and 0.4 percent for diacetone alcohol. The reaction product was clear and colorless.

EXAMPLE 3

The catalyst used was prepared by reducing "Palladium-Alumina" [marketed by Nippon Engelhardt Company; pellet (3 mm in diameter and 3 mm in hight); palladium content 0.5 percent] in the hydrogen stream at 200° C. 30 ml. of acetone and 10 ml. of the catalyst were introduced into an autoclave of 100 ml. capacity provided with a stirrer, and the autoclave was immersed in an oil bath and was heated to 180° C. Hydrogen was then introduced into the autoclave to a total inside pressure of 16.5 kg./cm$^2$, the partial vapor pressure of hydrogen in the autoclave being 1.0 kg./cm$^2$ (the vapor pressure of acetone is 15.5 kg./cm$^2$ at 180° C.). As the reaction proceeded fresh hydrogen was introduced intermittently to compensate the decreased amount of hydrogen and maintain the inside pressure at 16.5 kg./cm$^2$. After 3.5 hours of reaction the autoclave was cooled and the reaction product discharged was analyzed by means of gas chromatography after removal of hydrogen and the catalyst. The conversion of acetone was 48.1 percent and the selectivities were 94.2 percent for MIBK, 0.6 percent for isopropyl alcohol, 0.1 percent for mesityl oxide, 3.0 percent for diisobutyl ketone, 1.5 percent for 4,6-dimethylheptanone-2, 0.4 percent for diacetone alcohol, and 0.2 percent for unidentified substances. The reaction product was clear and colorless.

EXAMPLE 4

The catalyst used was prepared by impregnating "Active Alumina" (spherical; marketed by Norton Company) with an aqueous solution containing 2 percent of HCl of palladium chloride at 25° C. for 60 minutes and, after being dried, reducing with hydrogen at 300° C. The amount of palladium supported on the alumina was 0.35 percent. 30 ml. of acetone and 10 ml. of the above catalyst were introduced in the autoclave of 100 ml. capacity provided with a stirrer, and the autoclave was heated to a temperature of 180° C. in an oil bath. Hydrogen was then introduced to a total inside pressure of 17.5 kg./cm$^2$ at 180° C., the partial pressure of hydrogen in the autoclave being 2.0 kg./cm$^2$. As the reaction proceeded fresh hydrogen was introduced intermittently to compensate the decreased amount of hydrogen and maintain the inside pressure at 17.5 kg./cm$^2$. After 3.5 hours of reaction the autoclave was cooled and the reaction product discharged was analyzed by means of gas chromatography, after removal of hydrogen and the catalyst. The conversion of acetone was 42.3 percent and the selectivities were 95.6 percent for MIBK, 0.3 percent for isopropyl alcohol, 0.1 percent for mesityl oxide, 2.2 percent for diisobutyl ketone, 1.3 percent for 4,6-dimetylpentanone-2, 0.4 percent for diacetone alcohol, and 0.1 percent for unidentified substances. The reaction product was clear and colorless.

EXAMPLE 5

The catalyst used was prepared by impregnating "Active Alumina" (spherical; marked by Norton Company) with an aqueous solution containing 2 percent of HCl of the mixture of thorium nitrate and palladium chloride at 25° C. for 60 minutes, heating the dried material in the air at 400° C., and reducing then with hydrogen at 300° C. The amount of thorium oxide and palladium metal supported on active alumina was 5 percent and 0.35 percent respectively. 30 ml. of acetone and 10 ml. of the catalyst prepared as above were introduced in an autoclave of 100 ml. capacity provided with a stirrer, and the autoclave was heated to a temperature of 180° C. in an oil bath. Hydrogen was then introduced to a total inside pressure of 17.5 kg./cm$^2$ at 180° C., the partial pressure of hydrogen in the autoclave being 2.0 kg./cm$^2$. As the reaction proceeded fresh hydrogen was introduced intermittently to compensate the decreased amount of hydrogen and maintain the inside pressure at 17.5 kg./cm$^2$. After 3.5 hours of reaction the autoclave was cooled and the reaction product discharged was analyzed by means of gas chromatography after removal of hydrogen and the catalyst. The conversion of acetone was 56.1 percent and the selectivities were 93.3 percent for MIBK, 0.2 percent for isopropyl alcohol, 0.05 percent for mesityl oxide, 4.0 percent for diisobutyl ketone, 2.3 percent for 4,6-dimethylpentanone-2, 0.1 percent for diacetone alcohol and 0.05 percent for unidentified substances. The reaction product was clear and colorless.

EXAMPLE 6

The catalyst used was prepared by impregnating "Active Alumina" (spherical; marketed by Norton Company) with an aqueous solution (containing 2 percent of HCl) of the mixture of zirconium nitrate and palladium chloride at 25° C. for 60 minutes, drying at 130° C. after removal of the excess solution, heating in the air at 400° C. for 5 hours, and reducing with hydrogen at 300° C. The amount of zirconium oxide and palladium metal supported on active alumina was 5 percent and 0.35 percent respectively. 30 ml. of acetone and 10 ml. of the above catalyst were introduced in an autoclave of 100 ml. capacity provided with a stirrer, and the autoclave was heated to a temperature of 140° C. in an oil bath. Hydrogen was then introduced into the autoclave to a total inside pressure of 8 kg./cm$^2$ at 140° C., the partial pressure of hydrogen in the autoclave being 1.0 kg./cm$^2$. As the reaction proceeded fresh hydrogen was introduced intermittently to compensate the decreased amount of hydrogen and maintain the inside pressure always at 8 kg./cm$^2$. After 3.0 hours of reaction, the autoclave was cooled and the reaction product discharged was analyzed by means of gas chromatography after removal of hydrogen and the catalyst. The analytical result showed that the conversion of acetone was 43 percent and the selectivities were 93.9 percent for MIBK, 0.2 percent for isopropyl alcohol, 0.06 percent for mesityl oxide, 3.8 percent for diisobutyl ketone, 1.7 percent for 4,6-dimethylheptanone-2, 0.32 percent for diacetone alcohol and 0.02 percent for unidentified substances. The reaction product was clear and colorless.

EXAMPLE 7

The catalyst used was prepared by impregnating "Active Alumina" (a product of Sumitomo Chemical Company, designated as "KH–12") with an aqueous solution (containing 2 percent of HCl) of the mixture of zirconium nitrate and palladium chloride at 20° C. for 60 minutes, drying at 130° C. after removal of the excess solution, heating in the air at 400° C. for 5 hours, and reducing with hydrogen at 300° C. The amount of zirconium oxide and palladium metal supported on the active alumina was 5.5 percent and 0.37 percent respectively. 30 ml. of acetone and 10 ml. of the above catalyst were introduced into an autoclave of 100 ml. capacity provided with a stirrer, and the autoclave was heated to a temperature of 140° C. in an oil bath. Hydrogen was then introduced into the autoclave to a total inside pressure of 8 kg./cm$^2$ at 140° C., the partial pressure of hydrogen in the autoclave being 1.0 kg./cm$^2$. As the reaction proceeded, hydrogen was introduced intermittently to compensate the increased amount of hydrogen in the autoclave and maintain the total pressure always at 8 kg./cm$^2$. After 3.2 hours of reaction, the autoclave was cooled and the reaction product discharged was analyzed by means of gas chromatography after removal of hydrogen and the catalyst. The analytical result showed that the conversion of acetone was 47 percent and the selectivities were 94.0 percent for MIBK, 0.12 percent for isopropyl alcohol, 0.07 percent for mesityl oxide, 3.7 percent for diisobutyl ketone, 1.8 percent for 4,6-dimethylheptanone-2, 0.3 percent for diacetone alcohol and 0.01 percent for unidentified substances. The reaction product was clear and colorless.

EXAMPLE 8

The catalyst used was prepared by impregnating "Active Alumina" (spherical; marketed by Norton Company) with an aqueous solution (containing 2 percent of HCl) of the mixture of chromium nitrate and palladium chloride at 25° C. for 60 minutes, drying at 130° C., heating in the air at 400° C., for 5 hours and reducing with hydrogen at 300° C. The amount of chromium oxide and palladium metal supported on the active alumina was 5 percent and 0.35 percent respectively. 30 ml. of acetone and 10 ml. of the above catalyst were introduced into an autoclave of 100 ml. capacity provided with a stirrer, and the autoclave was heated to a temperature of 140° C. in an oil bath. Hydrogen was then introduced into the autoclave to a total inside pressure of 8 kg./cm$^2$ at 140° C., the partial pressure of hydrogen in the autoclave being 1.0 kg./cm$^2$. As the reaction proceeded fresh hydrogen was introduced to compensate the decreased amount of hydrogen and maintain the total pressure always at 8 kg./cm$^2$. After 3.5 hours of reaction, the autoclave was cooled and the reaction product discharged was analyzed by means of gas chromatography after removal of hydrogen and the catalyst. The analytical result showed that the conversion of acetone was 45 percent and the selectivities were 93.7 percent for MIBK, 0.21 percent for isopropyl alcohol, 0.05 percent for mesityl oxide, 3.9 percent for diisobutyl ketone, 1.8 percent for 4,6-dimethylheptanone-2, 0.32 percent for diacetone alcohol and 0.02 percent for unidentified substances. The reaction liquid was clear and colorless.

What is claimed is:

1. A one-stage process for producing methyl isobutyl ketone from acetone and hydrogen, which comprises contacting acetone in the liquid phase with hydrogen in the presence of a catalyst selected from the group consisting of:
    a. Palladium and thorium oxide on activated alumina,
    b. Palladium and zirconium oxide on activated alumina, and
    c. Palladium, thorium oxide and zirconium oxide on activated alumina at a temperature of from 100° to 250° C. under a total pressure of the vapor pressure of acetone corresponding to the reaction temperature and a partial pressure of hydrogen of 0.1 – 10 kg/cm$^2$.

2. The process according to claim 1, wherein the amount of palladium supported on the alumina is 0.1 to 5 percent by weight of the alumina, wherein the amount of thorium oxide and/or zirconium oxide is 2 to 30 percent by weight of the catalyst, and wherein the reaction temperature is from 130° to 210° C.

* * * * *